May 6, 1952 M. J. RELIS 2,595,297
METHOD AND APPARATUS FOR MEASURING ELECTRICAL IMPEDANCES
Filed June 26, 1947 6 Sheets-Sheet 1

Inventor
*M. J. Relis*
By
*M. D. Hayes*
Attorney

May 6, 1952 M. J. RELIS 2,595,297
METHOD AND APPARATUS FOR MEASURING ELECTRICAL IMPEDANCES
Filed June 26, 1947 6 Sheets-Sheet 4

Inventor
M. J. Relis
By M. O. Hayes
Attorney

May 6, 1952 M. J. RELIS 2,595,297
METHOD AND APPARATUS FOR MEASURING ELECTRICAL IMPEDANCES
Filed June 26, 1947 6 Sheets-Sheet 5

Inventor
M. J. Relis
By M. Hayes
Attorney

May 6, 1952 M. J. RELIS 2,595,297
METHOD AND APPARATUS FOR MEASURING ELECTRICAL IMPEDANCES
Filed June 26, 1947 6 Sheets-Sheet 6

Inventor
M. J. Relis
By M. A. Hayes
Attorney

UNITED STATES PATENT OFFICE 2,595,297

METHOD AND APPARATUS FOR MEASURING ELECTRICAL IMPEDANCES

Matthew J. Relis, Ferndale, N. Y.

Application June 26, 1947, Serial No. 757,298

24 Claims. (Cl. 175—183)

(Granted under the act of March 3, 1883, as amended April 30, 1928; 370 O. G. 757)

This invention relates to a null method and apparatus for measuring characteristics of electrical impedances, and particularly measuring directly the dissipation factor D or the Q of the impedances. More specifically, the invention contemplates an arrangement in which an A.-C. voltage of desired frequency is simultaneously applied to two channels both connected to a null detector whereby, when the voltages in said channels are equal in amplitude and in predetermined phase relationship at the detector, it gives a null indication. One of said channels includes a circuit adapted to have the impedance to be measured inserted therein and adapted to be tuned to series resonance at the frequency of the voltage applied to the channel, the tuned circuit causing a phase shift of substantially 90 degrees and an increase in the voltage in the channel of substantially $1/D$ times. In either one of the channels is also connected means for causing an additional phase shift of substantially 90 degrees in the voltage therein, and in either one of the channels is also disposed means adjustable at will for causing the voltages at the null detector to be substantially equal in amplitude. The last mentioned adjustable means, according to the preferred embodiment of the invention, is directly calibrated in terms of the ratio of resistance to reactance of the impedance to be measured, thereby to give a measure of the dissipation factor of the impedance. The frequency of the voltage in the tuned circuit being known, the reactance of the impedance to be measured may be determined in terms of the reactance of a standard variable impedance employed to tune the circuit to resonance.

Prior art devices for measuring the quality factor Q or dissipation factor D of an impedance have not been entirely satisfactory for a number of reasons. One of the best known devices has been the conventional Q meter. In the conventional Q meter, a known voltage is injected into a series tuned circuit, and the voltage across one of the impedances is measured. The Q of the circuit is determined by dividing the resonant rise in voltage by the known or injected voltage. If the injected voltage is maintained at a predetermined value, the meter indicating the resonant voltage may be directly calibrated in values of Q. This apparatus has a number of disadvantages. The accuracy with which the Q can be determined depends upon the accuracies of the meters being used in reading the two voltages. It has proved difficult in practice to hold the error due to the meters alone to 1 percent or less over a wide frequency range. Furthermore, the error is likely to increase when the lower portion of one of the voltmeter scales is being used.

A further disadvantage of the conventional Q meter is that the accuracy with which small changes in Q can be determined is poor. For example, suppose that it were desirable to determine the value of a resistor which, when placed in parallel with the tuned circuit, causes a 1 percent change in Q. If the probable error of measurement were 1 percent, it would be impossible to measure this small change in Q.

In making measurements in iron-core inductances, it is often necessary to know how the Q and inductance change with changes in the value of the alternating voltage across them. Since every Q measurement with the conventional Q meter requires the making of two meter readings, the probability of errors is increased.

Furthermore, in the conventional Q meter, resonance is obtained by adjusting the standard capacitor or inductance until the voltage resulting from the resonant rise in the circuit is maximum. In such an arrangement there is always some uncertainty as to the value of the proper setting of the standard impedance for maximum response, especially at lower values of Q where the maximum is broad. This also makes this method of Q measurement highly inaccurate when substitution measurements are to be made.

A variety of conventional bridges may also be used for determining the Q or D of an impedance, for example, the Owen, Maxwell or Hay bridges. Bridges in general have the disadvantages that they require a well shielded output transformer or a Wagner ground; they require extensive shielding; the impedances of three of the bridge arms must be precisely known, and if corrections are not to be made, the effect of residual impedances in these arms must be negligible over the entire frequency range; and the Q dial or D dial can be made direct reading at only one frequency.

The apparatus of the subject invention overcomes many of the aforementioned disadvantages. In the subject invention, the accuracy with which Q or D can be determined does not depend on the reading of a voltmeter. It depends mainly on the accuracy of a voltage divider. Measurements on iron-core inductances can be made very easily, since changing the voltage across the unknown impedance does not affect the readings except if it causes a change in the inductance of the unknown impedance, in which case the controls can be rebalanced and the change in impedance can be determined.

Furthermore, in the subject invention a calibrated vacuum tube or other high impedance voltmeter is not necessary, unless it is desired to know the voltage across the unknown impedance. Since the apparatus embodying the subject invention is a null instrument, the balance is sharp and therefore the setting of the variable reactance employed in tuning the circuit to resonance is much more accurate than in the conventional Q meter, making possible the accurate determination of small changes in reactance. Further advantages of the subject invention are that the sensitivity of the D balance, as will be hereinafter explained more fully, is independent of D or of frequency, the calibration of the D dial associated with the aforementioned voltage divider is independent of frequency, and in the preferred embodiment no shielded transformer or Wagner ground is necessary.

These advantages are obtained by employing an arrangement in which a single source provides the voltage for injection into the tuned circuit, and also provides for comparison a second voltage which is, in some embodiments of the invention, automatically maintained at a predetermined value with reference to the injected voltage. In the preferred embodiment, since the resonant voltage across the variable standard impedance, in this case a variable condenser, lags the injected voltage by 90 degrees, the second voltage is derived from a phase shifting network which shifts it 90 degrees with respect to the injected voltage. The voltage across the condenser is adjusted toward resonance and is applied across a variable voltage divider, the output of which is adjustable in amplitude. A null condition exists when the circuit is tuned to resonance and the output of the voltage divider equals the second voltage. The D or Q, as given by the ratio between the injected voltage and the resonant voltage selectively in accordance with the calibration of the voltage divider, may then be determined directly from the setting of the voltage divider, as will be hereinafter explained more fully.

One of the objects of the invention is to provide a new and improved method of measuring the Q or dissipation factor of an electrical impedance.

Another object of the invention is to provide new and improved null type impedance measuring apparatus.

Another object of the invention is to provide a new and improved Q or D meter in which the accuracy of measurement does not depend upon the accuracy of calibration of an indicating meter.

Still another object of the invention is to provide a new and improved impedance measuring apparatus in which the value of D or Q may be obtained directly from a dial setting.

Still another object is to provide a new and improved Q or D meter suitable for use at high frequencies.

A further object is to provide impedance measuring apparatus in which a shielded transformer is unnecessary.

Still a further object is to provide impedance measuring apparatus suitable for measuring the Q or D of inductors of the type in which the inductance thereof is a function of the applied voltage.

Still a further object is to provide a new and improved Q or D meter in which no calibrated voltmeter is required.

Still a further object is to provide a new and improved Q or D meter having a sharp balance condition.

Still a further object is to provide a new and improved Q or D meter in which the sensitivity of the resistance balance is substantially independent of Q or frequency.

A still further object is to provide a new and improved Q or D meter in which the calibration of the Q or D dial is independent of frequency.

A still further object is to provide a new and improved null detector circuit suitable for use in the invention.

A still further object is to provide a new and improved null type Q or D meter in which reference and tuned voltages are adjusted by calibrated means into equality and phase in a manner to give a measurement of the Q or D of the impedance under test.

Other objects and advantages not hereinbefore set forth will be apparent after a consideration of the specification and the accompanying drawings, in which.

Figure 1:
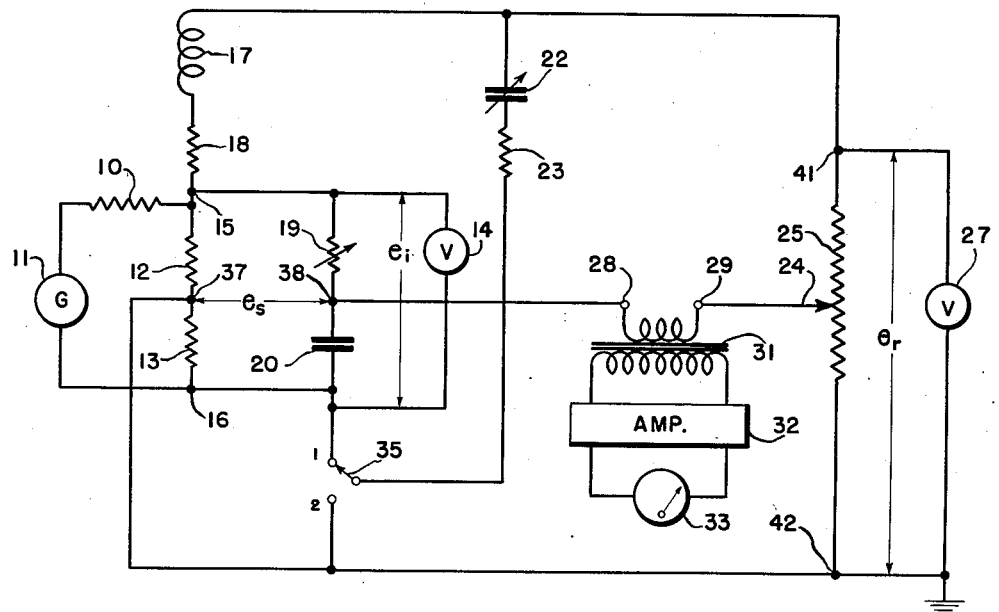
Fig. 1 is a diagrammatic view of a simplified form of the invention.

Referring now to the drawings, in which like reference characters are used throughout to designate like parts, and more particularly to Fig. 1 thereof, there is shown a generator of any convenient design designated by the numeral 11 and having an internal impedance 10 which is preferably as low as may be conveniently obtained. The voltage from the generator preferably has a substantially sinusoidal waveform. Across the generator terminals 15 and 16 is connected a voltage divider comprising equal resistances 12 and 13, the generator developing a voltage $e_1$ across the voltage divider. If desired, a voltmeter 14, for example, a vacuum tube voltmeter, may be connected across the generator terminals. Across the terminals are also connected in series a variable resistance 19 and a condenser 20.

Connected to one of the generator terminals 15 is an inductor 17 having a resistance 18. To the other end of the inductor is connected a variable condenser 22, the losses in which are represented by the equivalent series resistance 23, the other end of the condenser being connected to the arm of a single pole double throw switch 35, the contact 1 of which is connected to generator terminal 16, the contact 2 of which is connected to the midpoint between resistors 12 and 13. This midpoint between resistors 12 and 13 is also connected to ground and to one end of a high resistance potentiometer 25, the other end of the potentiometer being connected to the point between inductor 17 and condenser 22. The arm 24 of the potentiometer is connected to one of the null detector terminals 29, the other null detector terminal 28 being connected to the point between condenser 20 and resistor 19.

Across the detector terminals 28 and 29 may be connected any suitable null indicating device, for example, the primary of transformer 31, the transformer, which is preferably shielded, having the secondary thereof connected to the input terminals of an amplifier 32 of conventional design which preferably has a D.-C. blocking condenser in the input circuit thereof, for reasons to be subsequently apparent, and which has an indicating meter 33 across the output terminals thereof. A high impedance voltmeter 27, for example, a vacuum tube voltmeter, may be connected across the potentiometer 25 if desired.

In the circuit of Fig. 1, when the switch 35 is on contact 1, the voltage from generator 11 is injected into a circuit adapted to be tuned to series resonance and comprising, in series, generator impedance 10, inductor 17 having the aforementioned resistance 18, condenser 22 having the aforementioned equivalent series resistance 23, and switch 35. The shunting effect across the generator of series resistors 12 and 13, and of resistor 19 and condenser 20 may be neglected. As will be readily understood by those skilled in the art, when the circuit is tuned to series resonance, there is a resonant voltage across the condenser 22 equal to Q times the generator voltage, or to be more precise, Q times the potential difference across terminals 15 and 16, where Q is the Q of the entire circuit, and is defined as the ratio $X/R'$, where $X$ is the reactance of either reactive element, and $R'$ is the total equivalent series resistance of the circuit. The Q of the unknown impedance is equal to $X/R$, where R is its series resistance. By proper design R can be substantially equal to $R'$, or the difference between the two can be accounted for, so that this instrument in effect measures the Q of the unknown impedance, in a manner to be further explained subsequently.

Errors are introduced in the measurements as a result of the parallel impedance of the voltage divider in some embodiments, the presence of small out-of-phase voltages in the circuit caused by the phase shifting network, the generator impedance, and losses in the variable standard reactance, but upon proper design of the circuit these may be obviated, or accounted for.

Across the generator is also connected the aforementioned voltmeter 14 and the phase shifting network, the network comprising aforementioned series resistors 12 and 13 having a midpoint 37, and aforementioned variable resistor 19 and condenser 20 connected in series and having a junction 38. Resistors 12 and 13 are substantially equal, so that the voltage drop across each resistor is equal to $$\frac{e_i}{2}$$

where $e_i$ is the generator or injected voltage. When the resistance of the resistor 19 equals the reactance of condenser 20, the voltage $e_s$ between points 37 and 38 is 90 degrees out of phase with the generator voltage and is equal to $$-j\frac{e_i}{2}$$

Under these conditions $\omega R_p C_p = 1$, where $\omega = 2\pi$ times the generator frequency $f$, $R_p$ is the resistance of element 19, and $C_p$ is the capacitance of condenser 20.

The voltage $e_s$ between points 37 and 38 is impressed across a portion of the complete circuit of Fig. 1 including the lower portion of divider 25 between the arm 24 and point 42 and the primary of transformer 31 connected across detector terminals 28 and 29.

At resonance, the voltage $e_r$ across the divider 25 equals $-jQe_i$, when Q is the Q of the entire circuit containing the reactance elements 17 and 22. With reference to the voltage divider, let $R_1$ represent the resistance between the arm 24 and point 42, and $R_2$ represent the resistance between the arm 24 and point 41. Then, when $$\frac{R_1}{R_1+R_2}[-jQe_i] = -j\frac{e_i}{2}$$

substantially no potential difference will exist between arm 24 and point 38, and substantially no current will flow in the primary of the transformer 31 connected to null detector terminals 28 and 29. A null condition or balance exists under these conditions. At balance, $$Q = \frac{R_1+R_2}{2R_1}$$

Letting $r$ be the ratio of $$\frac{R_1}{R_1+R_2}$$

then $$Q = \frac{1}{2r}$$

The Q, then, may be directly determined from the fractional setting of the voltage divider, the dial of which may be calibrated in Q if desired. Since the dissipation factor D, as expressed by the formula $R/X$ where R is the series resistance, equals $$\frac{1}{Q}$$

then $D = 2r$. In the preferred embodiment to be described subsequently, the dial of the voltage divider is directly calibrated in D.

The other condition of balance is $$X = 1 - \frac{1}{4Q^2}$$

where $$X = \frac{\omega}{\omega_0}$$

where $$\frac{\omega_0}{2\pi}$$

is the resonant frequency of the tuned circuit, and $$\frac{\omega}{2\pi}$$

is the frequency of the voltage applied to the circuit. Thus, $\omega_0$ is varied by varying the standard impedance comprising, in the embodiment shown in Fig. 1, the condenser 22.

In practice, a value of $C_p$ for capacitor 20 is chosen and the value $R_p$ of resistance 19 required to fill the condition $\omega R_p C_p = 1$ is calculated as a function of $\omega$. The variable resistor 19 may have a dial which is direct reading in frequency, $$f = \frac{\omega}{2\pi}$$

In making a measurement at a frequency $f$, the unknown impedance, in the circuit shown the inductance 17, is connected into the circuit, a generator 11 supplying a voltage of frequency $f$ is connected to terminals 15 and 16, and resistor 19 is adjusted to the proper value of $R_p$, as may be conveniently shown by an aforementioned dial calibrated in frequency. The arm 24 of the voltage divider may be set at a convenient position, for example, a Q value of 10. The standard impedance 22 is then adjusted until the null meter 33 in the output circuit of the detector amplifier 32 reads a minimum, the voltage divider arm 24 is moved or adjusted to secure a smaller minimum, the standard impedance readjusted, and the two balance controls are alternately adjusted until balance is obtained. In practice, the balance converges rapidly with not more than two adjustments of each control. When null is obtained the series circuit is substantially at resonance and, as previously stated, the Q is determined from the fractional setting of the voltage divider at balance, and the reactance of the unknown impedance may be calculated from the frequency and the value indicated by the setting at balance of the standard variable reactance.

Preferably, to avoid the introduction of large errors in measurement, the resistance of divider 25 should be considerably greater than the parallel resonant impedance of the tuned circuit including inductance 17 and condenser 22. The combined resistance of the parallel paths comprising the generator impedance and the resistors 12 and 13 should be considerably smaller than the sum of the resistance 18 of inductor 17 plus the equivalent series resistance 23 of condenser 22.

When switch 35 is on contact 1, the voltage across the voltage divider 25 is the resultant of the voltage appearing across condenser 22 and a voltage $$\frac{e_i}{2}$$

90 degrees out of phase with the voltage across this condenser. Under these conditions, assuming that the voltage across the voltage divider is due to that across the condenser 22 alone, for a Q of 10 or greater the error from this source is less than .15 percent. For Q's less than ten, the error from this source increases and becomes 1 percent for Q=3.5.

Assume now by way of description that switch 35 is in its lower position and makes contact at 2. In such a position, the low potential end of condenser 22 is returned to ground and to the point 37 between resistors 12 and 13. This arrangement avoids the errors mentioned above when the switch is on 1, but causes a factor of 2 change in the calibration of the voltage divider, since the voltage injected into the tuned circuit is now ½ of its former value; at balance the Q is twice what it would be for the same reading of the dial indicator of arm 24 with the switch on 1.

$$X=1, Q=\frac{1}{r}$$

at balance when the switch is in this position.

Figure 2:
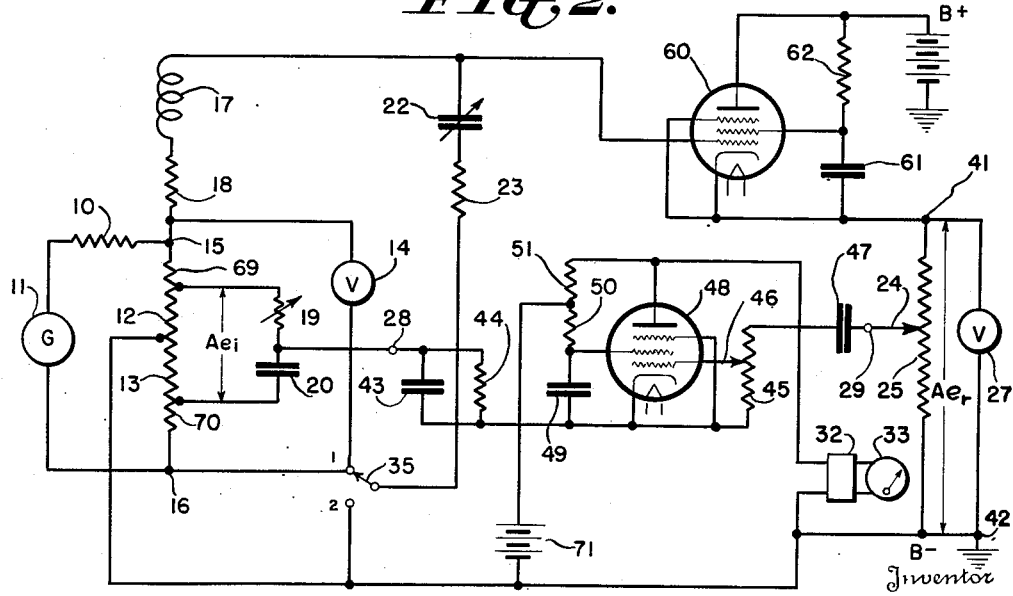
Fig. 2 is a diagrammatic view of the preferred embodiment of the invention.

Reference is made now to Fig. 2 which shows a schematic diagram of the preferred embodiment of the device. As stated previously in connection with the circuit of Fig. 1, the voltage divider 25 which is effectively in parallel with the parallel resonant impedance of the tuned circuit of inductance 17 and capacitor 22 results in a reduction in the Q of the tuned circuit and introduces an error in the measurement. In practice, the impedance of the voltage divider of Fig. 1 may be made as high as practicable, but there are limits to the extent to which this can be done. Residual parameters, mainly capacitance, increase as the resistance is increased, resulting in a reduction of the frequency range over which the instrument may be used. Furthermore, as the resistance of 25 is increased, stray capacitances from point 41 and from arm 24, to ground, become troublesome.

The circuit of Fig. 2 avoids this difficulty by employing a cathode follower tube 60 which is preferably a pentode having as high a transconductance as possible, between the tuned circuit and the voltage divider. The tube 60 has associated therewith the screen grid resistor 62 and screen by-pass condenser 61. As is well known in the art, the input impedance of a cathode follower of proper design may be made very high. With the cathode follower may be employed a voltage divider having a resistance of, for example, 50,000 ohms.

The gain A of the cathode follower is less than unity, and may be, for example, 0.95. The alternating voltage at the cathode of the cathode follower and across voltage divider 25 will then be $Ae_r$, where $e_r$ is the resonant voltage across the tuned circuit. This change in operating conditions is compensated for by impressing a voltage $Ae_i$ across the phase shifting network. In Fig. 2, the resistors 12 and 13 as shown have in series therewith across the generator terminals 15 and 16 the resistors 69 and 70, the values of which are so chosen that the desired voltage $Ae_i$ is applied to the network.

The circuit of Fig. 2 further differs from that of Fig. 1 in the null detector employed. In Fig. 2, the transformer 31 has been replaced by an electron discharge tube generally designated at 48. The cathode of the tube is connected by resistor 44 and by-pass condenser 43 in parallel to the null detector terminal 28. The cathode is also connected through potentiometer 45 and coupling condenser 47 to the null detector terminal 29. The arm 46 of the potentiometer is connected to the control grid of the tube 48 which is preferably a pentode having a high amplification factor. The screen grid of the tube 48 has the bypass capacitor 49 connected therefrom to cathode and has the resistor 50 connected therefrom to a suitable source of plate potential, for example, battery 71. To avoid the introduction of substantial errors in measurement, the value of screen grid resistor 50 should preferably be large compared to the impedance looking into the output terminals of the phase shifting network. The positive terminal of battery 71 is also connected by way of load resistor 51 to the plate of tube 48, and the negative terminal of the battery is connected to ground. The plate has connected therefrom to ground a null indicator, for example, the aforementioned amplifier 32 having output meter 33 connected thereto.

It is observed that the detector terminals 28 and 29 of Fig. 1 have connected thereacross the transformer 31. Since neither of these points is at ground potential in Fig. 1, the use of a shielded transformer is indicated. However, a well shielded transformer has large intershield and winding-to-shield capacitance, and since the shield is grounded this capacity appears across the output of the voltage divider, introducing attenuation and phase shift and their resultant errors.

The arrangement of Fig. 2 comprising tube 48, as before stated, eliminates the need for the shielded transformer in the null detector circuit. When a vacuum tube amplifier (in the circuit shown the one-tube amplifier of tube 48) is connected across terminals 28 and 29, it can be demonstrated that the A.-C. output voltage of the amplifier is not zero when $e_1-e_2=0$, but is zero when $e_1-e_2=e_2/\mu$, where in Fig. 2 $e_1$ is the voltage between arm 24 and ground, $e_2=e_s$, and $\mu$ is the amplification factor of tube 48. Therefore in Fig. 2, in the output of amplifier 32 which is connected to the tube 48 there is an error of $1/\mu$ in the determination of D. The tube 48 is preferably a pentode having an amplification factor in the order of 1000 or greater, in which case the abovementioned error is less than 0.1 percent.

Figure 3:
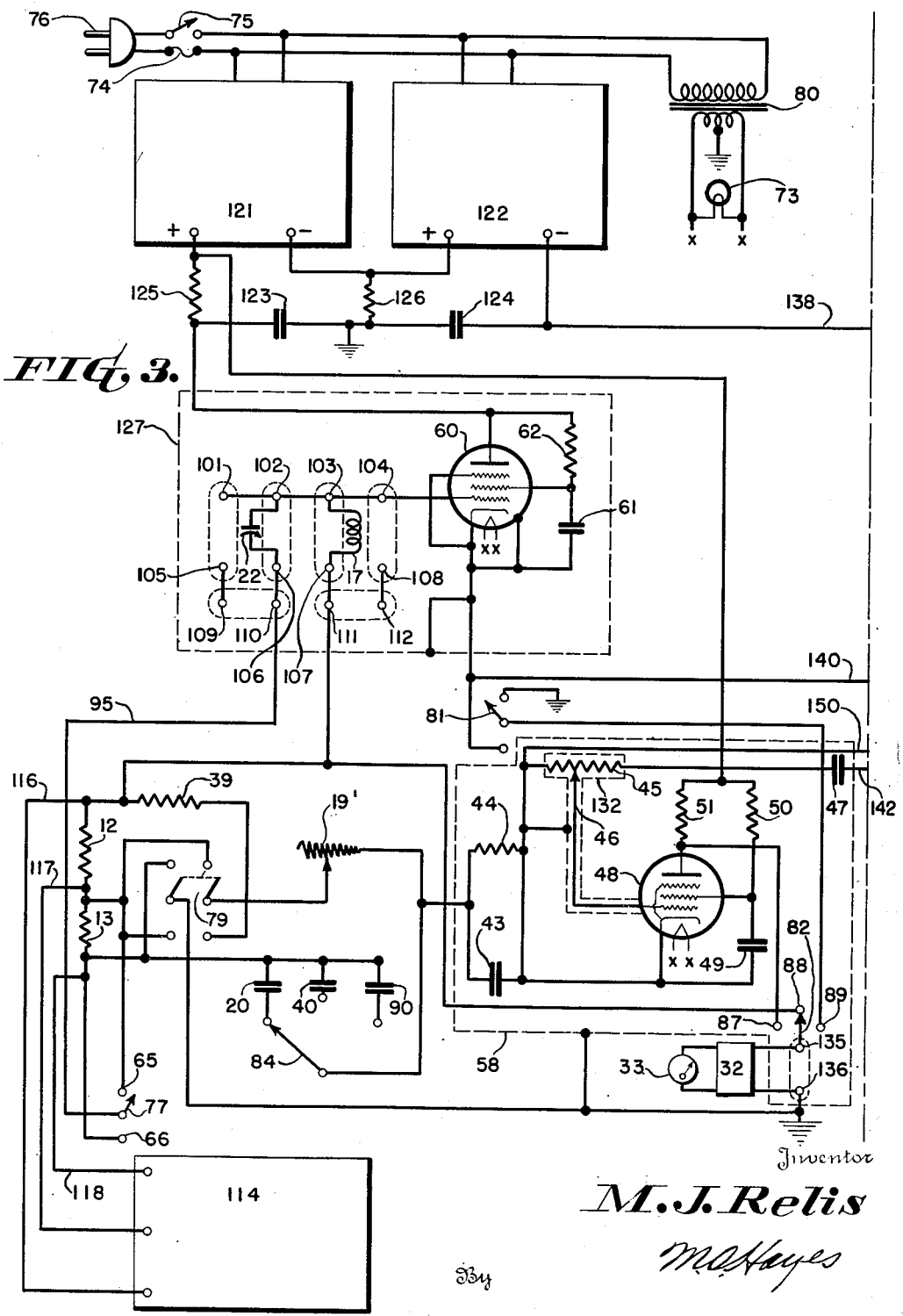
Figs. 3 and 4 are diagrammatic views of the complete electrical circuit of the preferred embodiment.
Figure 4:
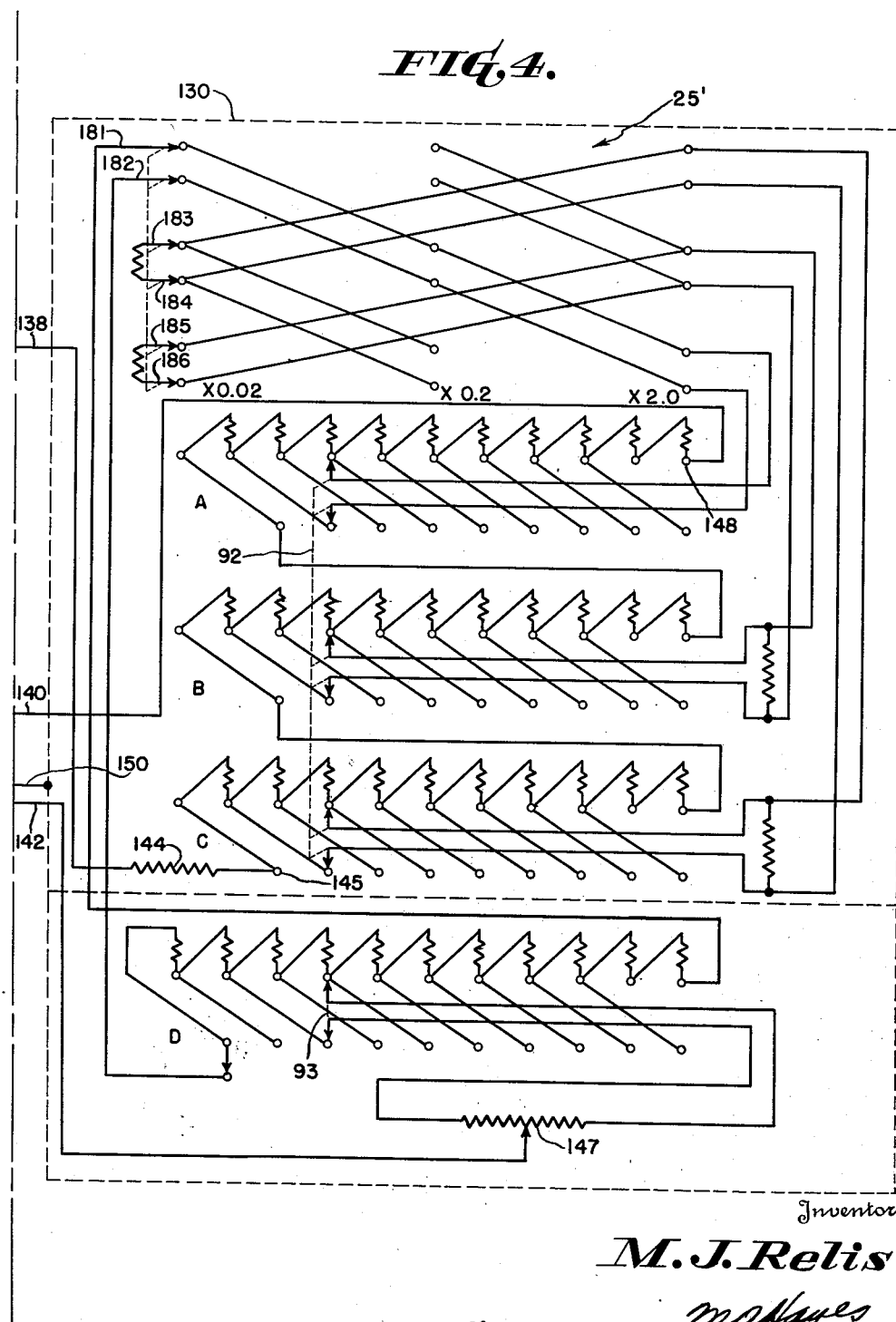

Reference is made now to Figs. 3 and 4 which show a schematic circuit diagram of a complete electrical circuit of the preferred embodiment of the invention. This circuit, as will be subsequently explained more fully, includes a number of refinements over the basic circuit of Fig. 2.

In Figs. 3 and 4, the voltage divider 25 of Fig. 2 has been replaced by a number of decade resistance devices and resistance multipliers, permitting precise measurements of dissipation factors between the values of 0.002 and 2.0. A terminal strip is provided having a number of terminals for conveniently connecting in circuit the unknown and standard impedances, as well as other impedances if it is desired to make substitution measurements. A frequency multiplier capacitor arrangement is provided for extending the range of frequencies at which measurements can be made, and a switch is provided for permitting one voltmeter to be employed to measure both $e_s$ and $e_r$, and to also be employed as a null indicating instrument.

In Fig. 3, the plug 76 is designed for insertion in a conventional socket or outlet of a suitable source of potential, for example, 110 v., 60 cycles. Leads including switch 75 and fuze 74 run from the plug to the input terminals of two regulated power supplies 121 and 122 which may be of conventional design and adapted to supply D.-C. potentials of the order of 250 volts. Across the 110 volt leads is also connected a filament transformer 80 having a secondary winding suitable for supplying filament potential to the filaments of tubes 60 and 48, and having connected thereacross pilot lamp 73.

The negative terminal of supply 121 is connected through resistor 126 to ground; the positive terminal thereof is connected to the junction of resistors 50 and 51 in the circuit of tube 48, and is also connected through resistor 125 to the plate or anode of tube 60, the anode being connected through condenser 123 to ground.

The positive terminal of supply 122 is connected through resistor 126 also to ground, and the negative terminal is connected through capacitor 124 to ground. This negative terminal is also connected through lead 138 and resistor 144 to the terminal 145 of one of the resistance decades of the voltage divider 25', for purposes to be hereafter more fully explained. The capacities of 123 and 124 should preferably be large so that the reactances of these elements at the frequency of the voltage of generator 114 will be small, for example, 5 ohms each. The value of resistor 125 should be chosen so that the voltage drop thereacross is small, for example, 10 volts.

In Fig. 3, the generator 11 of Fig. 2 has been replaced by a variable frequency oscillator 114 of conventional design, preferably having a low internal impedance of, for example, 0.1 ohm, having an output transformer with a center-tapped secondary, the ends of the secondary being connected by leads 116 and 118 to the ends of the resistance network comprising resistors 12 and 13, the center tap of the secondary being connected by lead 117 to the center point between resistors 12 and 13.

Assuming by way of description that switch 79 is closed in its lower position, Fig. 3, a circuit is traced as follows: from the upper end of resistor 12 through resistor 39 through switch 79 through variable resistor 19' through switch 84 through condenser 20 to the lower terminal of resistor 13. This circuit comprises a phase shifting network similar to the corresponding portion of Fig. 1. The junction between switch 84 and resistor 19' is connected through resistor 44 to the cathode of tube 43 for purposes to be subsequently apparent.

From the upper end of resistor 12 a lead goes to terminal posts 111 and 107, and the center contact 88 of switch 82 for purposes to be hereafter described. The arm of switch 82 connects to terminal post 135, the terminal post 136 being connected to ground.

From the lower end of resistance 13 of Fig. 3 a lead goes to lower contact 66 of switch 77, which corresponds to switch 35 of Fig. 2. Assuming switch 77 is closed on contact 66 of Fig. 3, the circuit is further traced through lead 95 to terminals 110 and 106. Contact 65 of switch 77 is connected to the midpoint between resistors 12 and 13.

The terminal group shown associated with cathode follower tube 60 has included therein six sets of terminals, comprising respectively 101 and 105, 102 and 106, 103 and 107, 104 and 108, 109 and 110, and 111 and 112. Terminals 101, 102, 103, and 104 are all connected together as shown and are connected to the control grid of cathode follower tube 60. The tube 60, aforementioned terminal strip, and closely associated component parts may be, if desired, enclosed within a shield 127.

The purpose of some of the terminals will be explained more fully subsequently. Assuming that the unknown impedance to be measured is represented as before by the inductance 17, which is connected as shown in Fig. 3 between terminals 103 and 107, and that the variable standard reactance element represented by condenser 22 is connected as shown in Fig. 3 between terminals 102 and 106, then the circuit which is adapted to be tuned to series resonance and in which the resonant rise of voltage occurs is traced as follows: from the upper end of resistance 12 to terminal 111 to terminal 107 through inductor 17 to terminal 103 to terminal 102 through capacitor 22 to terminal 106 to terminal 110 through lead 95 to the arm of switch 77 to contact 66 through resistor 13 through resistor 12 to the starting point. When the circuit is tuned to series resonance, as it is at balance or null condition, there is a resonant rise of voltage therein equal to Q times the voltage which generator 114 develops across resistors 12 and 13, where Q as before is the Q of the entire circuit.

The cathode follower tube 60 has the cathode thereof connected by lead 149 to terminal 148 of the upper decade resistance of Fig. 4, the various decades A, B, C, and D and multipliers thereof being connected to form a variable voltage divider 25', which may be enclosed within a suitable shield 130, which may be connected by lead 150 to the cathode of tube 48. The manner in which the various resistance elements of 25' of Fig. 4 are connected together to form a divider and multipliers is conventional and need not be described or traced in detail. Contacts 181, 182, 183, 184, 185, and 186 of the multiplier are preferably ganged, and a 6 circuit, 3 position rotary selector switch may be employed, if desired. Decades A, B, and C are preferably ganged together and operated by a 6 contact 11 position rotary switch. The arm of variable potentiometer 147 is connected through lead 142 to coupling condenser 47 of null detector tube 48. As previously explained, terminal 145 of the resistance network of Fig. 4 is connected by way of resistor 144 and lead 138 to the negative terminal of power supply 122, which is by-passed to ground by capacitor 124. This arrangement is provided so that the grid circuit of tube 60 may be maintained at substantially ground potential with respect to the D.-C. voltages in the plate and cathode circuits of the tube, thereby avoiding the possibility of shock to the operator of the equipment and other undesirable effects.

In Fig. 4, the resistance looking into the input leads 138 and 140 of voltage divider 25' has a constant value, preferably 50,000 ohms, when no current flows in lead 142. The output voltage between lead 142 and lead 138 is a fraction of the voltage between lead 140 and lead 138, said fraction being variable over a wide range, preferably from 0.001 to 1.0.

The resonant voltage of the aforedescribed series resonant circuit of inductor 17 and capacitor 22 is accordingly impressed across the tube 60 and resistance decade and multiplier arrangement of Fig. 4, which constitute the aforementioned voltage divider 25'. The output of the divider is applied through lead 142 to the input of null detector tube 48. Tube 48 and closely associated component parts may, if desired, be enclosed within shield 58. The gain control 45 may be further enclosed within a shield 132. The input circuit of null detector tube 48 also has applied thereto by a circuit previously traced the output of the phase shifting network energized from source 114. Figs. 3 and 4 comprise then the essential features of Figs. 1 and 2: a source of voltage; a circuit in which a resonant voltage is developed; a voltage divider connected to said circuit; a phase shifting network energized from the source; a null detector; and a circuit including the null detector and receiving energy both from the phase shifting network and the output of the voltage divider.

The plate of tube 48, Fig. 3, is connected to terminal 87 of switch 82. Across the terminals 135 and 136 is connected the aforementioned amplifier 32 and output meter 33. When switch 82 is on contact 87, the meter 33 is employed as the null indicating instrument. When switch 82 is on contact 88, assuming switch 79 closed in its downward position, meter 33 by suitable calibration may read the value of the generator voltage developed across resistor 12, or $e_1/2$. When switch 82 is on contact 89, assuming switch 81 closed on its lower contact, meter 33 may, by suitable calibration, read the A.-C. voltage across the voltage divider 25', or $Ae_r$, where, as before, A is the gain of tube 60.

It was stated in conjunction with the description of the circuit of Fig. 2 that, to compensate for the fact that the gain of the cathode follower 60 is less than unity, a voltage $Ae_1$ was applied to the phase shifter, this voltage having been obtained by a suitable voltage divider arrangement. The circuit of Figs. 3 and 4 does not employ this method of compensating for the loss of the cathode follower tube 60, but instead, has a circuit for calibrating the gain of the cathode follower. To accomplish this, the reactance element 17 has a jumper placed thereacross between the associated terminals 103 and 107. Switch 79 is closed in its upper position, Fig. 3. In such a position the output of the generator is applied directly to the grid of the cathode follower tube, and as before, the output of the voltage divider is applied to the input circuit of the null detector tube 48. Since, however, no reactance elements are now included in the circuit, the voltage across the voltage divider is 180 degrees out of phase with the generator voltage. Accordingly, the output of the phase shifting network is not applied to the input circuit of tube 48, but a comparison voltage of proper polarity is obtained from the generator and is applied to the null detector circuit in phase with the output of the voltage divider. The circuit of Fig. 3, when switch 79 is closed in its up position, accomplishes this, as will be readily apparent from a consideration thereof. With switch 82 on contact 87, the voltage divider 25' is adjusted until meter 33 indicates a null condition, in which case the gain of the cathode follower tube 60 may be obtained from the setting of the voltage divider 25', employing the formula $$A = \frac{1}{2r}$$

$r$ having been hereinbefore defined. D equals the dial reading (Fig. 5) times A.

The switch 77, as before stated, serves a purpose corresponding to the switch 35 of Fig. 2, and is employed to alter the resonant circuit depending upon whether the Q of the impedance to be measured exceeds or is less than 10.

As previously stated, a condenser frequency multiplier arrangement is provided, to extend the frequency range of the apparatus. This includes switch 84 and condensers 20, 40, and 90. As previously stated, a condition of operation is that $\omega C_p R_p = 1$. By providing for the choice of one of three capacitors of different value, it is obvious that the frequency range is accordingly extended. Capacitors 20, 40, and 90 may have values of 1.0μf., 0.1μf., and 0.01μf., respectively.

The aforementioned terminal arrangement associated with tube 60 is provided to permit maximum flexibility and utility of the instrument when, for example, it is desired to make a substitution measurement. Or, if it is desired to ascertain changes in the Q of the circuit under certain conditions, an inductor may be connected between terminals 104 and 108 and any desired element connected in series therewith between terminals 111 and 112, or a capacitor may be connected across terminals 101 and 105, and any desired element connected in series therewith between terminals 109 and 110.

Figures 5, 6, 7:
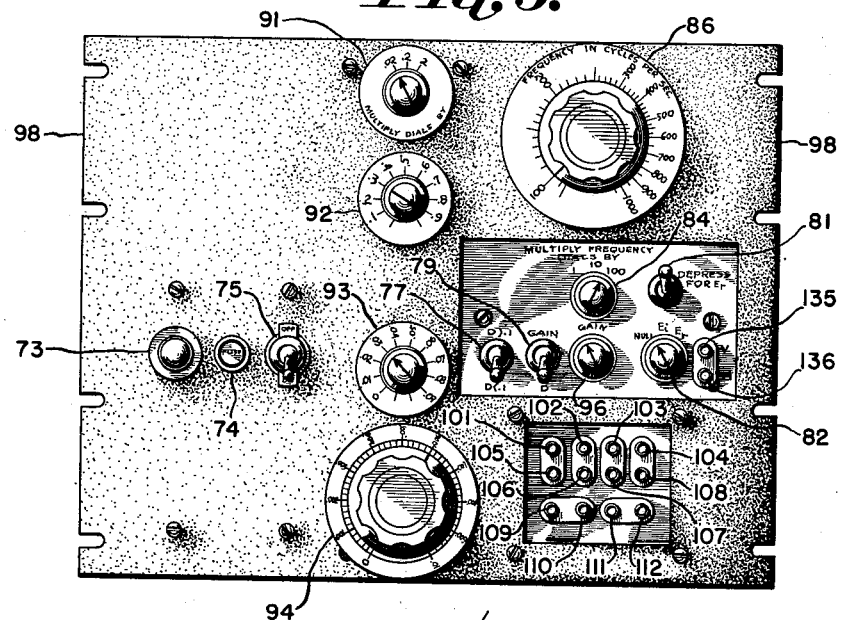
Fig. 5 is a front elevation of a suitable panel arrangement of the measuring instrument.
Fig. 6 is a diagrammatic view of a second embodiment of the invention suitable for use at high frequencies.
Fig. 7 is a block diagram of the form of the invention as shown in Fig. 1.

Reference is made now to Fig. 5, which shows in front elevation a suitable panel arrangement of controls for the circuit of Figs. 3 and 4. On the panel 98 the variable elements of the voltage divider 25' have control knobs 91, 92, 93, and 94 with associated dials suitably calibrated in values of D. Knob 91 controls the position of the multiplier switch, knobs 92 and 93 the positions of the decade resistance switches, and knob 94 the position of the arm of potentiometer 147. Knob 86 with its associated dial suitably calibrated in frequency controls the value of resistance 19'. Knob 96 controls the position of arm 46 of potentiometer 45 and thereby the gain of null detector tube 48. Switch 82 of Fig. 3 has a similarly designated knob in Fig. 5. Switch 84 of Fig. 3 also has a similarly designated knob in Fig. 5.

Reference is made now to Fig. 6, which shows an embodiment of the invention particularly adapted for use at high or radio frequencies. As is well known, considerable difficulty is usually encountered in attempting to make variable resistance devices to operate at high frequencies. Stray capacities, undesired inductance, and contact difficulties limit the usefulness of such devices. To overcome these limitations, the circuit of Fig. 6 employs a capacitance voltage divider. The phase shifting network comprising elements 19 and 20 of Figs. 1 and 2 is replaced in Fig. 6 by a fixed resistance 159 and variable capacitor 160, the capacitor being adjusted until the required operating condition $\omega R_p C_p = 1$ is obtained for a given frequency of the voltage from generator 11. The voltage divider comprises series connected variable capacitors 154 and 155, the center point between capacitors going to null detector terminal 29. To provide for the flow of anode current in cathode follower tube 60', the fixed resistance 156, which may be of any desired value, for example, 50,000 ohms, is connected from cathode to ground. Whereas the capacitance voltage divider is shown as having two variable capacitors, it is of course understood that one fixed capacitor may be employed if desired. The operation of the circuit of Fig. 6 will be readily understood from the foregoing description of the operation of the circuits of Figs. 1 and 2. The setting of the voltage divider may be directly calibrated in values of Q or D.

Reference is made now to Fig. 7 which is a block diagram of the invention as shown in Fig. 1. The apparatus indicated in block form by the numeral 152 is a zero phase shift attenuator of known, controllable attenuation and high input impedance. The apparatus indicated in block form by the numeral 151 is a 90 degree lagging phase shifting network of fixed attenuation. At 153 is indicated a null detector of any convenient design, for example, a null detector comprising a four terminal network in which an A.-C. voltmeter is connected across the two upper input leads, Fig. 7, very high impedances are connected from each of the upper input leads to the respective lower input leads, and the two lower input leads are connected together.

Figure 8:
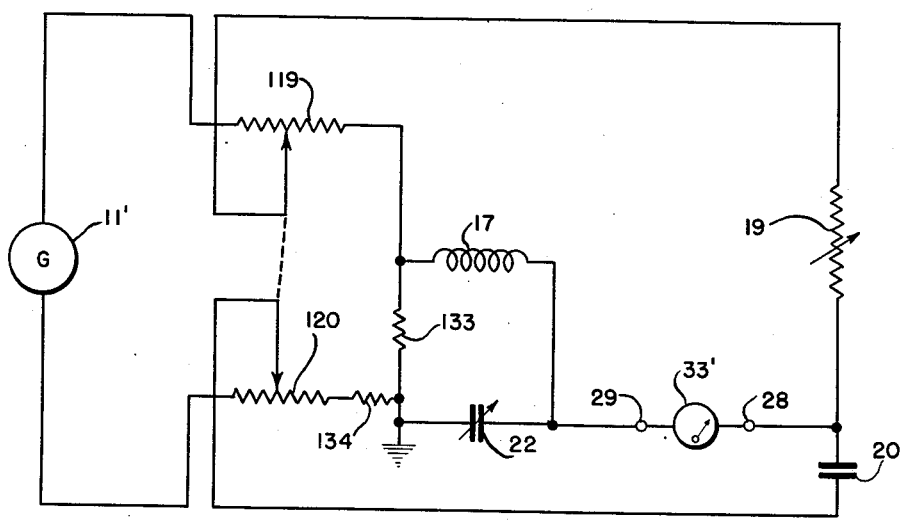
Fig. 8 is a modification of the circuit of Fig. 1.

Reference is made now to Fig. 8, which shows a modification of the circuit of Fig. 1, in which two of the fixed resistances of the phase shifting network of Fig. 1 have been replaced by two balanced potentiometers which are simultaneously varied to vary the amplitude of the voltage output of the phase shifter. This voltage output is adjusted until it balances in amplitude the resonant voltage in the tuned circuit, thereby to obtain a null condition.

In Fig. 8, generator 11' preferably has a low impedance and delivers a substantially greater voltage than the generator 11 of Fig. 1. Across the generator terminals is connected a resistance network comprising series resistances 119, 133, 134, and 120. Resistances 133 and 134 are equal, of relatively small value, and have their midpoint connected to ground. Potentiometers 119 and 120 have large equal resistances and the arms thereof are preferably ganged together so that the magnitude of the resistances between the arms and the respective ends are maintained substantially equal at all times while the arms are being moved. The arms of potentiometers 119 and 120 are respectively connected to resistor 19 and condenser 20, which latter elements have their other ends connected together and to detector terminal 28. The midpoint between resistors 133 and 134 is connected to one terminal of the standard variable reactance 20, and the junction between resistors 119 and 133 has connected thereto inductor 17, the other end of the inductor 17 being connected to condenser 22 and to null detector terminal 29. Across the null detector terminals 28 and 29 may be connected a suitable null detector 33'.

The operation of the circuit of Fig. 8 will be obvious in view of foregoing descriptions of the operation of the circuit of Fig. 1. Resistances 119 and 120 should preferably be $$\frac{1}{D_{min}}$$

times as great as resistances 133 and 134, where $D_{min}$ is the smallest value of D to be measured. The voltage across resistance 133 due to generator 11' is injected into the tuned circuit of capacitor 22 and indicator 17, which is adapted to be tuned to resonance at the frequency of generator 11'. The phase shifting network comprises resistances 119, 120, 133, 134, and 19 and capacitor 20. When the voltage applied to the null detector by the phase shifting network is equal in amplitude and opposite in phase to that applied by capacitor 22, no effective voltage exists across null detector terminals 29 and 28. Suitable dial means or setting indicators may be operatively connected to the arms of potentiometers 119 and 120 and calibrated in D or Q.

Figure 9:
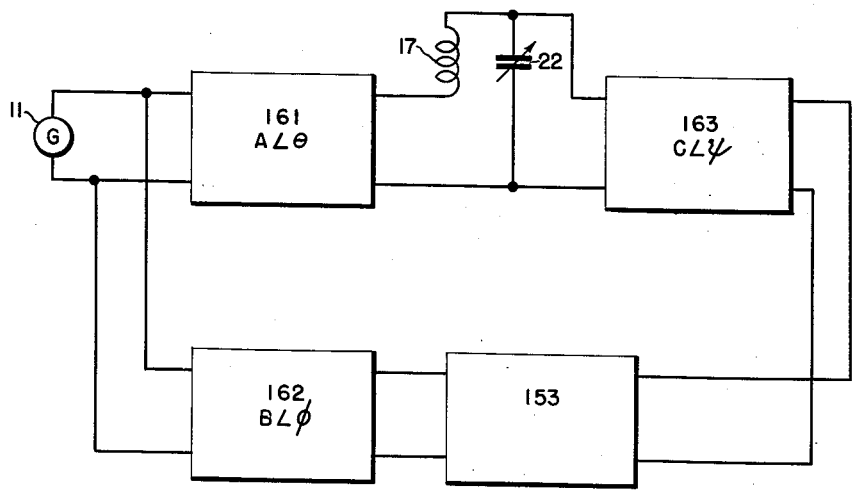
Fig. 9 is a view similar to Fig. 7 but illustrating a further modification.

Reference is made now to Fig. 9, which shows a view similar to Fig. 7 but illustrating a further modification. The apparatus designated in box form by the reference character 161 is a network having low output impedance whose transmission as modified by terminal impedances has a magnitude A and a phase shift $\theta$. At 163 is a similar network having high input impedance with corresponding characteristics C and $\psi$, and at 162 is a network similar to 163 with corresponding characteristics B and $\phi$. It is obvious that since networks 161 and 162 are connected to the same source, they could have certain elements in common, as in Fig. 8. At 153 is a null detector which indicates a null when the voltage applied to one pair of terminals is equal to and in phase with the voltage applied to the other pair of terminals. Then a null condition will be indicated when the magnitude of the transmission from the generator through one path to one pair of detector terminals is equal to the transmission from the generator through the other path to the other pair of detector terminals, or when at resonance $AC = BD$ where $D = 1/Q$, and $\theta + \psi - \phi = 90°$. When the null condition is obtained, Q may be determined from a knowledge of A, B, and C. In Fig. 9 the null condition is obtained by varying 22 for the reactive balance and by varying A, B or C individually or in any combination, provided that $\theta + \psi - \phi = 90°$ is constant, independent of the latter variation.

Figure 10:
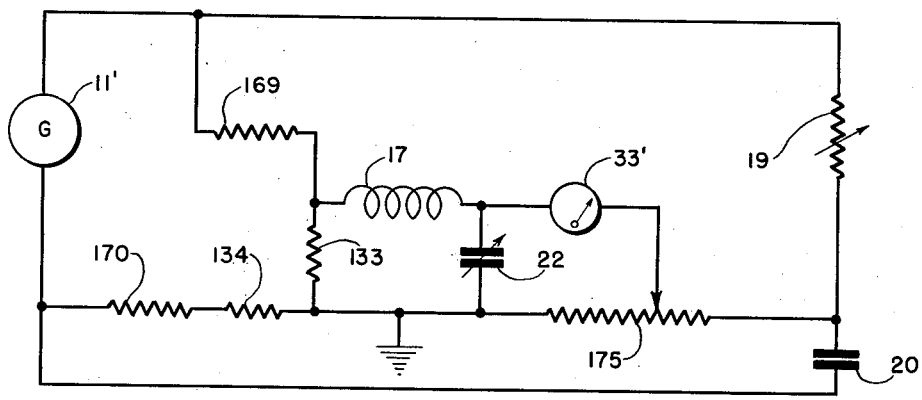
Fig. 10 is a modification of the circuit of Fig. 8.

Reference is made now to Fig. 10, which shows a modification of the circuit of Fig. 8, in which the variable voltage dividers 119 and 120 which adjust the input voltage to the phase shifting network have been replaced by fixed resistors 169 and 170 respectively, and the output of the phase shifting network applied to a voltage divider 175, the arm of which is connected to null detector 33'. The operation of this circuit will be apparent from foregoing descriptions of the operation of the circuits of Figs. 1 and 8, and need not be described in detail.

Figure 11:
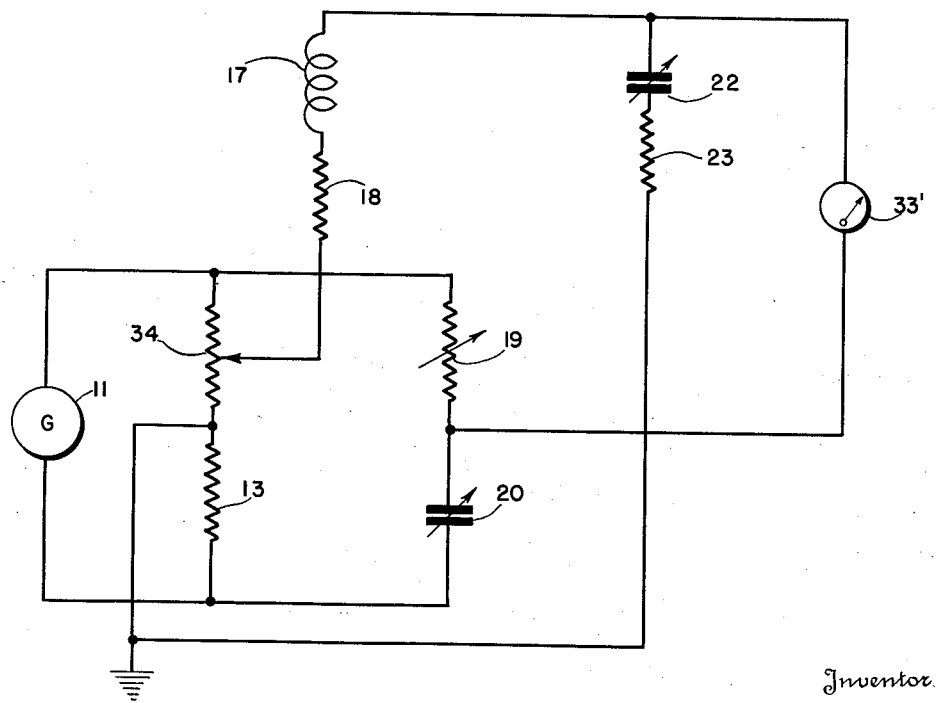
Fig. 11 is a modification of the circuit of Fig. 1.

Reference is made now to Fig. 11, which shows a modification of the circuit of Fig. 1. In Fig. 11, the resistor 12 has been replaced by a potentiometer 34 having a total resistance equal to the resistor 13. The total value of resistor 34 should be small compared to the sum of resistances 18 and 23. The potential difference between the arm of potentiometer 34 and the lower end thereof is applied to the tuned circuit of inductor 17 and capacitor 22, and this voltage is adjusted until the resonant voltage equals the output of the phase shifting network, as evidenced by a null indication on the meter 33'.

Whereas some embodiments of the invention have been shown and described with reference to the use of four terminal null indicators, which indicate a null when the voltages in the two channels are in phase, and some embodiments have been shown and described with reference to the use of an A.-C. voltmeter of conventional design as a null indicator, which indicates a null when the two comparison voltages are applied in phase opposition across the voltmeter terminals, it is understood that either type of null indicator may be used where desired, suitable modification of the circuit connections being made. The "in phase" and "in phase opposition" relations are defined generically herein as being a colinear vector phase relation.

Any suitable means may be employed for heating the filaments or heaters of the various electron discharge devices.

Whereas my invention has been shown and described with reference to some embodiments thereof which give satisfactory results, it will be understood by those skilled in the art, after reading the specification, that certain modifications of form or structure may be made without departing from the scope or spirit of the invention, and I therefore include all such modifications, mechanical and electrical, in the appended claims.

This invention may be manufactured and used by or for the Government of the United States of America for governmental purposes without the payment of any royalties thereon or therefor.

What is claimed as new and desired to be secured by Letters Patent of the United States is:

1. In apparatus of the character disclosed for measuring the dissipation factor of an electrical impedance, a series circuit, a source of voltage of predetermined frequency for energizing said circuit, said circuit including said electrical impedance and a variable impedance element adapted to be adjusted to a reactance conjugate to the reactance of the impedance to be measured at said frequency, a variable voltage divider of high resistance connected to said circuit in such a manner that a voltage substantially equal to the voltage across said variable impedance element is impressed across said voltage divider, said voltage divider being calibrated in terms of the ratio of the total resistance to the output resistance thereof in accordance with the instant setting of the divider, means for securing from said source a comparison voltage having a predetermined amplitude ratio to said source voltage and having a quadrature phase relationship with respect to the phase of said source voltage, a null detector sensitive to phase and amplitude null conditions, and a circuit including said null detector and interconnecting said voltage divider and said last named means for impressing said comparison voltage and the output voltage of said variable voltage divider on said detector whereby the setting of the voltage divider provides a measure of the dissipation factor of the impedance to be measured in terms of said ratios when the divider and variable impedance element have been alternately adjusted to positions producing amplitude and phase null conditions as indicated by said detector.

2. In apparatus of the character disclosed for measuring the ratio of resistance to reactance of an electrical impedance, in combination, a series circuit adapted to have said electrical impedance inserted therein, means for tuning said circuit to series resonance at a preselected frequency when the impedance to be measured is connected therein, means for inserting a predetermined exciting A.-C. voltage of said frequency into said circuit, a variable voltage divider having a setting indicator and having output terminals, said voltage divider being connected across said tuning means in such a manner that it has impressed thereacross a voltage substantially equal to the voltage across said tuning means when said circuit is tuned to resonance and excited by said exciting voltage, means for securing a second voltage of the same frequency as said exciting voltage and having quadrature phase and predetermined amplitude ratio relationships to said exciting voltage, a second circuit including said second voltage securing means and the output terminals of said voltage divider, and means in said second circuit for indicating a condition when the voltage across the output terminals of said voltage divider is substantially equal in amplitude to and in colinear vector phase relation with the voltage across said second voltage securing means, said setting indicator being calibrated to give a measurement of said ratio of resistance to reactance when said condition exists.

3. In apparatus of the character disclosed for measuring the characteristics of an electrical impedance, in combination, a first circuit adapted to have said electrical impedance connected in series therein, means for energizing said circuit by a first A.-C. voltage of predetermined amplitude and frequency, said circuit including variable reactor means whereby the circuit may be tuned to series resonance at said frequency when the impedance to be measured is connected therein, a second circuit, voltage divider means connected across said reactor and to said second circuit and adjustable at will for applying a portion of the resonant voltage in said first circuit to said second circuit, means for energizing said second circuit with a second A.-C. voltage of said frequency having a quadrature phase and predetermined amplitude relationship to said first A.-C. voltage, and null indicating means in said second circuit for indicating when said second voltage and the portion of said voltage applied to said second circuit are substantially equal in amplitude and have a colinear vector phase relationship, said equal amplitude and phase relationship being obtained by adjusting said voltage divider means and said variable reactor means alternately.

4. In apparatus of the character disclosed for measuring the dissipation factor of an electrical impedance, in combination, means for generating a first A.-C. voltage of predetermined amplitude and frequency, a series circuit in which said electrical impedance is adapted to be inserted and including a variable reactance element adapted to tune the circuit to series resonance at said frequency when said impedance is inserted therein, means for inserting said voltage into said circuit, a variable voltage divider having a setting indicator and connected across said variable reactance element in such a manner that it has impressed thereacross a voltage substantially equal to the voltage across said variable reactor when said circuit is tuned to resonance, means for obtaining a second voltage of said frequency having quadrature phase and predetermined amplitude relationships to said first voltage, a second circuit connected to said voltage divider and to the means for obtaining said second voltage to thereby have said second voltage and the output voltage of the voltage divider added vectorially therein, an amplifier having the input thereof operatively connected to said second circuit and adapted to be energized by the vector voltage sum therein, and means connected in the output circuit of said amplifier for indicating a condition when said vector voltage sum in said second circuit is substantially zero, said setting indicator being calibrated to give a measurement of the dissipation factor when said condition exists.

5. In apparatus of the character disclosed for measuring the characteristics of an electrical impedance, in combination, a generator adapted to produce an A.-C. voltage of predetermined frequency across the output terminals thereof, a series circuit connected to said generator terminals and adapted to include said electrical impedance and including a variable reactance for tuning said circuit to series resonance at said frequency when said impedance is included in said circuit, a variable voltage divider having output terminals, said voltage divider being connected across said variable reactance and adapted to have impressed thereacross a voltage substantially equal to the voltage occurring across said variable reactance, a phase shifting R.-C. network having input terminals and a shifted phase voltage output terminals, said phase shifting network input terminals being connected to said generator terminals, a variable impedance in said network for providing a quadrature voltage of said frequency at said network output terminals, a second circuit connected to the output terminals of said phase shifting network and to the output terminals of said voltage divider, and means in said second circuit for indicating when the effective vector voltage sum therein of the two voltages at said output terminals is substantially zero.

6. In apparatus of the character disclosed for measuring the ratio of resistance to reactance of an electrical impedance, in combination, a generator adapted to produce an A.-C. voltage of predetermined amplitude and frequency, a circuit energized from said generator and adapted to include in series said electrical impedance and including a variable reactance for tuning said circuit to series resonance at said frequency when said impedance is included therein, an electron discharge tube having an anode, grid, and cathode, means for energizing said tube, a variable voltage divider having output terminals, said voltage divider and the cathode-grid path of said electron discharge tube being connected in series across said variable reactance whereby a voltage substantially equal to the voltage across said variable reactance when said circuit is tuned to resonance is applied to said path and voltage divider, a pair of equal resistances connected in series across said generator, a condenser and variable resistance connected in series across said generator, a second circuit connected to the output terminals of said voltage divider and to the junction points between said pair of resistances and between said variable resistance and condenser respectively, and means in said second circuit for indicating when the effective voltage therein is substantially zero.

7. In apparatus of the character disclosed for measuring the ratio of resistance to reactance of an electrical impedance, in combination, a generator adapted to produce an A.-C. voltage of predetermined amplitude and frequency, a circuit connected to said generator and adapted to include in series said electrical impedance and including a variable reactance for tuning said circuit to series resonance at said frequency when said electrical impedance is inserted therein, an electron discharge tube having an anode, grid, and cathode, means for energizing said tube, a variable voltage divider having a setting indicator, said voltage divider and the cathode-grid path of said electron discharge tube being connected in series across said variable reactance whereby a voltage substantially equal to the resonant voltage across said variable reactance is applied to said path and voltage divider, a pair of equal resistances connected in series across said generator, a condenser and variable resistance connected in series across said generator, a second circuit connected to the output terminals of said voltage divider and to the junctions between said pair of resistances and between said variable resistance and condenser respectively, an electron tube amplifier connected to said second circuit and adapted to have the input thereof energized by the effective voltage in said second circuit, and an output meter connected to said amplifier and adapted to indicate when the effective voltage in said second circuit is substantially zero, said voltage divider being calibrated so that the setting indicator thereof indicates the ratio of resistance to reactance of said electrical impedance when said effective voltage is zero.

8. In apparatus of the character disclosed for measuring the dissipation factor D of an electrical impedance, in combination, a first pair of terminals adapted to have impressed thereacross an A.-C. voltage of predetermined amplitude and frequency, a second pair of terminals adapted to have connected thereacross indicating means responsive to the vector voltage difference between the terminals of said second pair, first and second channels connected to said first pair of terminals and adapted to be energized when a voltage is impressed thereacross, said channels being also connected to said second pair of terminals whereby when the voltages in said channels are equal in amplitude and in colinear vector phase relationship at said second pair of terminals the vector voltage across said second pair of terminals is substantially zero, one of said channels including a series circuit comprised of a reactor and adapted to have said impedance inserted therein, said circuit being adapted to be tuned to series resonance at said frequency when said impedance is inserted therein, said reactor being characterized in that it causes a phase shift of substantially 90 degrees in the voltage in said one of the channels, means in one of said channels for causing a phase shift of substantially 90 degrees in the voltage therein thereby to effect said colinear vector phase relationship, adjustable voltage means connected to one of said channels for causing a condition wherein the voltages at said second pair of terminals are substantially equal in magnitude when indicating means is connected to said second pair of terminals, and a setting indicator for said adjustable means, said setting indicator being calibrated in values of the dissipation factor of said electrical impedance when said condition exists.

9. The combination of claim 8 wherein said adjustable voltage means includes a potential divider comprising a pair of condensers connected in series across said reactor, at least one of said condensers having a capacity variable at will, said setting indicator being associated with the variable condenser.

10. The combination of claim 8 wherein said voltage adjusting means includes a voltage divider comprising a pair of condensers connected in series, at least one of said condensers having a capacity variable at will, said setting indicator being associated with the variable capacity, an electron discharge tube having an anode, grid and cathode, energizing means for said tube, said voltage divider and cathode-grid path of said tube being connected in series across said reactor whereby a voltage substantially equal to the voltage across said reactor is applied across said voltage divider and path.

11. In apparatus of the character disclosed for measuring the dissipation factor of an electrical impedance, in combination, a source of A.-C. voltage of predetermined amplitude and frequency, a series circuit in which said electrical impedance is adapted to be inserted and including a reactance element for tuning said circuit to series resonance at said frequency when said impedance is inserted therein, means for energizing said circuit with a predetermined portion of said voltage, a phase shifting network, means for energizing said phase shifting network with a predetermined portion of said voltage from said source, a variable voltage divider connected to said phase shifting network and adapted to have the output of the phase shifting network impressed thereacross, said variable voltage divider having a setting indicator, a null detector sensitive to phase and amplitude null conditions, said null detector being connected across said reactance element whereby a voltage equal in amplitude to the voltage across said electrical impedance is applied thereto, said null detector also being connected to said voltage divider whereby the output of the divider is applied to the detector, said detector giving a null indication when the two voltages applied thereto are of equal amplitude and colinear vector phase relation, said setting indicator being calibrated to give a measurement of said dissipation factor when said null detector indicates a null condition.

12. The method of measuring the quality factor Q of an electrical impedance which comprises generating a voltage of predetermined frequency and amplitude, resonating the impedance by means of a conjugate impedance at the predetermined frequency utilizing said impedance resonance to derive from said generated voltage a first derived voltage controlled by the Q of the impedance, deriving from said generated voltage a second derived voltage having a quadrature phase and predetermined amplitude relationship to the generated voltage, alternately adjusting said first derived voltage toward a value equal to Q times and in quadrature phase with the generated voltage by varying the reactance of the conjugate impedance and variably dividing said first derived voltage toward a resultant voltage substantially equal to and in colinear vector phase relation with said second derived voltage, and when said first derived voltage substantially equals Q times said generated voltage and said resultant voltage substantially equals and is in colinear vector phase relation with said second derived voltage measuring the quality factor of said electrical impedance in terms of the amount of said division and said predetermined amplitude relationship of the second derived voltage.

13. The method of measuring the dissipation factor D of an electrical impedance which comprises generating a voltage of predetermined frequency and amplitude, resonating the impedance by means of a conjugate impedance at the predetermined frequency, utilizing said impedance resonance to derive from said generated voltage a first derived voltage substantially 1/D times the generated voltage, deriving from the generated voltage a second derived voltage having a colinear vector phase relationship to said first derived voltage and a predetermined amplitude ratio to said generated voltage, variably dividing said first derived voltage to obtain a resultant voltage substantially equal in amplitude to said second derived voltage, and indicating the ratio of the magnitude of said resultant voltage to the magnitude of said first derived voltage thereby to obtain a measurement of the dissipation factor of said impedance in terms of the product of said ratios.

14. The method of measuring the quality factor Q of an electrical impedance which comprises generating a voltage of predetermined frequency and amplitude, resonating the impedance by means of a conjugate impedance at the predetermined frequency, utilizing said resonance to derive a first derived voltage having amplitude and phase controlled by the Q and reactance of the impedance from a portion of said generated voltage having a predetermined ratio to the full generated voltage, deriving from said generated voltage a second derived voltage having a quadrature phase relationship and predetermined amplitude ratio to the generated voltage, alternately adjusting the reactance of said conjugate impedance to adjust said first derived voltage toward a value equal to Q times and in quadrature phase relation with said portion and variably dividing said second derived voltage toward a resultant voltage having a value substantially equal to said first derived voltage, and when said first derived voltage substantially equals Q times said portion and said resultant voltage substantially equals said first derived voltage and a colinear vector phase relation exists therebetween, measuring the quality factor of said electrical impedance in terms of the product of the amount of said division and said ratios.

15. The method of measuring the quality factor Q of an electrical impedance which comprises generating a voltage of predetermined frequency and amplitude, resonating the impedance by means of a conjugate impedance at the predetermined frequency, variably dividing said generated voltage and applying a variable portion to said impedance in a manner to derive from said applied portion a first derived voltage controlled by the Q of the impedance, deriving from said generated voltage a second derived voltage having a quadrature phase relationship and predetermined amplitude ratio to the generated voltage, alternately adjusting said conjugate impedance to adjust said first derived voltage toward a value equal to Q times said portion and in quadrature phase relation therewith, and variably altering said portion toward a condition where said first derived voltage equals said second derived voltage, and when said first derived voltage equals Q times and is in quadrature with said portion and said second derived voltage equals and is in colinear vector phase relation with said first derived voltage measuring the quality factor of said electrical impedance in terms of the product of said ratio and the amount of said division.

16. The method of measuring and determining the quality factor Q of an electrical impedance which comprises generating a voltage of predetermined frequency and amplitude; resonating the impedance by means of a conjugate impedance at the predetermined frequency, applying at least a portion of said generated voltage to said impedance in a manner to derive a first derived voltage controlled by the Q of the impedance; deriving from the generated voltage a second derived voltage having a quadrature phase relationship to the generated voltage; deriving at least a portion of the first and at least a portion of the second derived voltages to provide first and second comparison voltages respectively; alternately adjusting said conjugate impedance to adjust said first derived voltage toward a value equal to Q times and in quadrature with the voltage portion applied to said impedance and adjusting at least one of the voltages comprising the portion of said generated voltage, and the second derived voltage, toward a condition where said first and second comparison voltages are equal in amplitude; and when said first derived voltage equals Q times the voltage applied to said impedance and said first comparison voltage equals and is in colinear vector phase relation with said second comparison voltage, measuring and determining the quality factor of said impedance in terms of the product of all the ratios of said first and second comparison voltages to said first and second derived voltages respectively and the ratio of said generated voltage to the voltage applied to said impedance and the ratio of said generated voltage to said second derived voltage.

17. The method of measuring and determining the dissipation factor D or selectively the quality factor 1/D of an electrical impedance which comprises generating a voltage of predetermined frequency and amplitude; resonating the impedance by means of a conjugate impedance at the predetermined frequency, applying at least a first proportion of said generated voltage to said electrical impedance in a manner to derive a first derived voltage controlled by the D of the impedance; deriving from at least a second proportion of said generated voltage a second derived voltage having a shifted phase relationship to said generated voltage; utilizing at least a third proportion of said first derived voltage to provide a first comparison voltage; utilizing at least a fourth proportion of said second derived voltage to provide a second comparison voltage; alternately adjusting said first derived voltage toward a value equal to 1/D times said first proportion and adjusting at least one of the first, second, third, and fourth proportions toward a condition where said first comparison voltage equals and is in colinear vector phase relation with said second comparison voltage; and when said first derived voltage equals 1/D times said first proportion and said first comparison voltage equals and is in colinear vector phase relation with said second comparison voltage, measuring and determining the dissipation factor or selectively the quality factor of said electrical impedance in terms of the product of all of said first, second, third, and fourth proportions.

18. In apparatus of the character disclosed for measuring the ratio of resistance to reactance of an electrical impedance in terms of the ratio of a resonant rise in voltage across an impedance to the voltage impressed thereon, the combination of a series circuit adapted to have said impedance inserted therein, means for tuning said circuit to series resonance at a predetermined frequency when the impedance to be measured is connected therein, means for inserting a first voltage of said frequency into said circuit, a cathode-follower circuit including an adjustable voltage divider and an electron discharge tube having a cathode, grid, and anode, means coupling said tuning means to the input of said cathode-follower circuit, means connecting said voltage divider to the output of said cathode-follower circuit to produce a voltage thereacross substantially equal to the product of the voltage across said tuning means and the gain of said cathode-follower circuit, a phase-shift network for securing a second voltage of said frequency having quadrature phase and a fixed amplitude ratio relationship to said first voltage, a null detector sensitive to phase and amplitude null conditions, means connecting the output of said voltage divider and said second voltage to said null detector for indicating when the voltage output of said voltage divider is substantially equal in amplitude and in colinear vector phase relation with said second voltage.

19. Apparatus according to claim 18 including in addition, means for short-circuiting the first circuit in which the impedance to be measured is inserted, a calibrating circuit, and switching means for connecting said calibrating circuit to said cathode-follower circuit whereby a voltage of predetermined phase and amplitude is applied to the control grid of said electron discharge tube when said first circuit is short-circuited in a manner whereby the gain of the cathode-follower may be calibrated from the position of the adjustable voltage divider when said divider is adjusted to provide a null indication.

20. In apparatus of the character disclosed for measuring the ratio of resistance to reactance of an electrical impedance, in combination, a series circuit adapted to have said electrical impedance included therein and including a variable reactance element for tuning said circuit to series resonance at a preselected frequency when said impedance to be measured is connected therein, means for generating a first A.-C. voltage of said predetermined frequency for energizing said circuit, an electron discharge tube having a cathode, grid, an anode, a variable voltage divider having a setting indicator and output terminals, said variable voltage divider being connected in series with the cathode-grid path of said electron discharge tube, means connecting said variable reactance element across said series connected path and voltage divider, means for obtaining a second A.-C. voltage of said predetermined frequency having a quadrature phase relationship and predetermined amplitude relationship to said first voltage, a null detector sensitive to phase and amplitude null conditions, means for applying said second voltage and the voltage at said output terminals to said null detector, and means in said null detector for indicating when said second voltage and the output voltage applied to said null detector add vectorially to substantially zero, said voltage divider being so calibrated that said setting indicator reading thereof when said voltages add to zero is proportional to the ratio of the total resistance thereof to that supplying said output terminals and to the ratio of resistance to reactance of said electrical impedance.

21. In apparatus of the character disclosed for measuring the ratio of resistance to reactance of an electrical impedance, a generator of A.-C. voltage of predetermined frequency and amplitude, a null detector sensitive to phase and amplitude null conditions, first and second channels energized from said generator and connected to said null detector whereby when the voltages in said channels are equal in amplitude and in collinear vector phase relationship at said detector said detector gives a null indication, one of said channels including a series circuit comprising a reactor and adapted to have said impedance inserted therein, said circuit being adapted to be tuned to series resonance at said frequency when said impedance is inserted therein, said reactor being characterized in that it causes a substantially 90° phase shift in the voltage thereacross with respect to said generator voltage, means in one of said channels for causing a phase shift of substantially 90° in the voltage therein thereby to effect said collinear vector phase relationship, and adjustable voltage means connected to one of said channels for causing the voltages applied to said null detector to be substantially equal in amplitude, said adjustable means being calibrated in values of the ratio of resistance to reactance of said impedance.

22. In apparatus of the character disclosed for determining the reactance of an electrical impedance, a source of A.-C. voltage of predetermined frequency and amplitude, a null detector sensitive to phase and amplitude null conditions, first and second channels energized from said source and connected to said null detector whereby when the voltages in said channels are equal in amplitude and in collinear vector phase relation at said detector said dectector gives a null indication, one of said channels including a series circuit adapted to have said electrical impedance inserted therein and containing a variable standard reactance adapted to tune the circuit to series resonance at said frequency when said impedance is inserted therein, a setting indicator for said variable standard reactance, means for applying the voltage across said standard reactance to said detector, said voltage being shifted 90° in phase, means in one of said channels for causing an additional phase shift of substantially 90° in the the voltage therein to thereby effect said colinear vector phase relation, and voltage adjusting means in one of said channels for adjusting the voltage at said null detector from said one channel to be substantially equal in amplitude to the voltage at said detector from the other of said channels when said circuit is tuned to resonance, the reactance of said electrical impedance being the conjugate of the reactance of the variable standard impedance as indicated from said setting indicator when said detector indicates a null condition.

23. In an apparatus for measuring the ratio of resistance to reactance of an electrical impedance, a generator of A.-C. voltage of predetermined frequency and amplitude, a null detector sensitive to phase and amplitude null conditions, first and second channels energized from said generator and connected to said null detector whereby when the voltages in said channels are equal in amplitude and in collinear vector phase relationship at said detector said detector gives a null indication, said first channel including a series circuit comprising a reactor and adapted to have said impedance inserted therein, said circuit being adapted to be tuned to series resonance at said frequency when said. impedance is inserted therein, said reactor being characterized in that it causes a substantially 90° phase shift in the voltage thereacross with respect to said generator voltage, phase shift means including a series R.-C. circuit in said second channel for causing a phase shift of substantially 90° in the voltage therein thereby to effect said collinear phase relationship, and adjustable voltage means including a pair of balanced voltage dividers in said second channel for producing two equal voltages of opposite polarity from said A.-C. voltage, said voltage dividers being connected to said R.-C. circuit, said voltage dividers being calibrated in values of ratio of resistance to reactance of said impedance.

24. In an apparatus for measuring the ratio of resistance to reactance of an electrical impedance, a generator of A.-C. voltage of predetermined frequency and amplitude, a null detector sensitive to phase and amplitude null conditions, first and second channels energized from said generator and connected to said detector whereby the detector gives a null indication when the voltages in said channels are equal in amplitude and in collinear vector phase relationship at said detector, said first of said channels including a series circuit adapted to have said impedance inserted therein and containing a variable standard reactance adapted to tune the circuit to series resonance at said frequency when said impedance is inserted therein, a setting indicator for said variable standard reactance, means for applying the voltage across said standard reactance to said detector, said last mentioned voltage being shifted 90° in phase, means in said second of said channels for causing an additional phase shift of substantially 90° in the voltage therein to thereby effect said collinear vector phase relation, and voltage adjusting means including a resistor and a potentiometer connected in series across said generator for adjusting the voltage at said null detector from said first channel to be substantially equal in amplitude to the voltage at said null detector from said second channel when said first channel is tuned to resonance, the reactance of said electrical impedance being the conjugate of the reactance of the variable standard impedance as indicated by the setting indicator when said detector indicates a null condition.

MATTHEW J. RELIS.

REFERENCES CITED
The following references are of record in the file of this patent:

UNITED STATES PATENTS

| Number | Name | Date |
|---|---|---|
| 1,919,284 | Walter | July 25, 1933 |
| 2,137,787 | Snow | Nov. 22, 1938 |
| 2,307,319 | Koehler | Jan. 5, 1943 |
| 2,337,759 | Loughlin | Dec. 28, 1943 |
| 2,367,965 | Rushing | Jan. 23, 1945 |
| 2,475,179 | Eltgroth | July 5, 1949 |